Feb. 17, 1953 — P. H. PETERS, JR — 2,629,050
VARIABLE ELECTRONIC CAPACITANCE DEVICE
Filed July 22, 1950
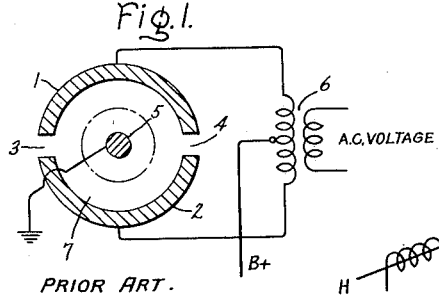
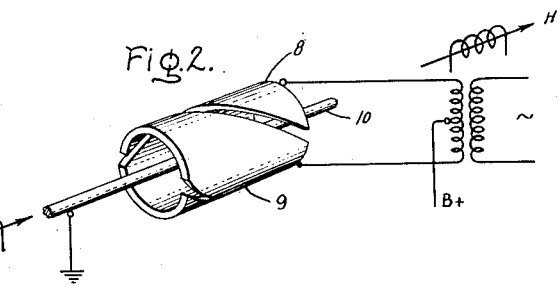
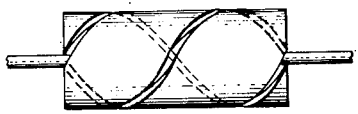
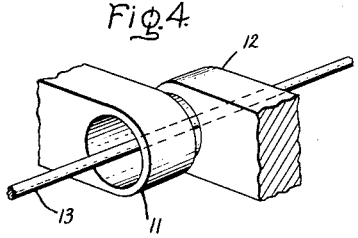
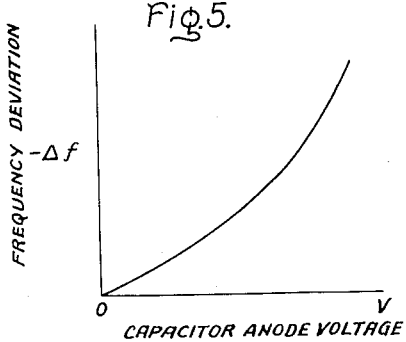
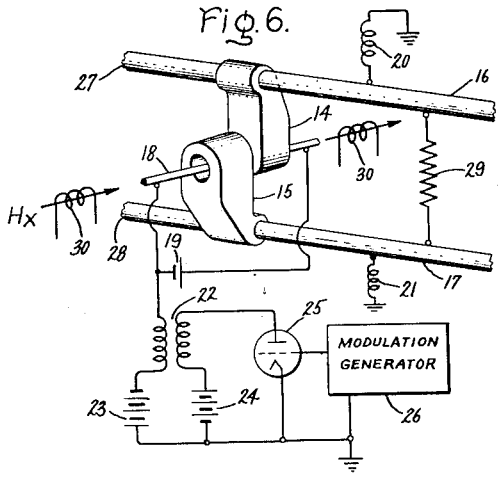
Inventor:
Philip H. Peters, Jr.,
by Paul A. Frank
His Attorney.

Patented Feb. 17, 1953

2,629,050

UNITED STATES PATENT OFFICE 2,629,050

VARIABLE ELECTRONIC CAPACITANCE DEVICE

Philip H. Peters, Jr., Schenectady, N. Y., assignor to General Electric Company, a corporation of New York Application July 22, 1950, Serial No. 175,462

3 Claims. (Cl. 250—27)

My invention relates to variable capacitors and more particularly to variable capacitors employing an electron cloud as the dielectric medium.

In the fields of radio and communications, modulation of one or more of the characteristics of an electro-magnetic wave for transmitting intelligence is well known. The characteristics of the wave which are generally modulated are the amplitude, the phase, and the frequency. In the case of frequency modulation, for example, the resonant frequency of a tank circuit including a variable reactor may be used to modulate a wave by causing the reactance of the variable reactor to vary at a determinable rate which is generally the frequency of the intelligence wave desired to be transmitted. In transmitting very high frequency intelligence waves, the variable reactor must respond very rapidly, that is, the reactance of the reactor should vary simultaneously with the high frequency intelligence modulating wave. An electron cloud type capacitor of the split anode type is a variable reactor which has an extremely short response time and, consequently, if properly adapted, finds application in a frequency modulating system, such for example, as television.

A problem arising when such a variable reactor is used to tune a high frequency oscillator is that magnetron action occurs in the reactor which alters the output power from the oscillator and distorts the frequency deviation curve of the system. It is, therefore, an object of this invention to provide an electronically variable capacitor having short response time and being free of magnetron effects.

It is another object of this invention to provide a variable capacitor which may be used to modulate a high frequency oscillator without affecting the output power of the oscillator.

It is still further object of this invention to provide an electron cloud type capacitor in which the radio frequency electric field within the structure approaches a direction parallel to the longitudinal axis of the cathode.

In the attainment of the foregoing objects, I provide a pair of anodes isolated from each other for high frequency waves and cylindrically located about a heated cathode, and a source of direct voltage interconnected between the anodes and the cathode. The direct voltage produces an electric field intensity between the cathode and the anodes which attracts electrons from the cathode to the anode. A magnetic field, which may be derived from a permanent magnet or an electro-magnet, is provided within the space enclosed by the anodes and is perpendicular to the normal direction of electron traffic from cathode to anodes. With the magnetic and electric fields present, any electrons emitted by the cathode rotate about the cathode within a cylindrical envelope which has a diameter dependent upon the magnitude of the two parameters, electric field intensity and magnetic field intensity. It is to be understood, of course, that suitable conditions exist for the maintenance of an electron cloud including the operation of the device in vacuum.

To prevent the electron cloud from rotating about the cathode in synchronism with the oscillator being tuned, the anodes of this reactance section are separated along lines which are divergent from the longitudinal axis of the cathode. Because of the direction of the line of separation between the anodes, an electric field intensity produced between the anodes by the high frequency oscillator being tuned or modulated has a very small component in a direction circumferential to the cathode such that even though the electron cloud may be rotating at a sub-harmonic frequency of the oscillator being controlled, the electron cloud gives up very little energy to the oscillator circuit and magnetron action is prevented. Because magnetron action is avoided, this variable capacitor may be used to frequency modulate a high frequency electromagnetic wave without appreciably changing the energy contained in the wave.

Further objects and advantages of this invention will become apparent and the invention will be more clearly understood from the following description referring to the accompanying drawing, and the features of novelty which characterize this invention will be pointed out with particularity in the claims annexed to and forming a part of this specification.

In the drawing, Fig. 1 is a schematic diagram of a prior art device used to facilitate an understanding of my invention; Figs. 2-4 illustrate several embodiments of my invention; Fig. 5 is a frequency deviation curve applicable to the embodiments of my invention shown; and Fig. 6 is a practical frequency modulation circuit employing the electron cloud capacitor of my invention.

Referring to Fig. 1 there is shown a simple split anode type of electron cloud capacitor in which the useful capacitance appears between a pair of anodes 1 and 2 which are separated from one another by a pair of diametrically opposite gaps 3 and 4 which are parallel to the longitudinal axis of cathode 5. A direct voltage source (not shown in the drawing) has its positive terminals connected to anodes 1 and 2 and its negative terminal connected to cathode 5. A constant radial electric field is thus produced between cathode 5 and anodes 1 and 2, and a source of magnetic flux (not shown in the drawing) provides a magnetic field which is parallel to the longitudinal axis of cathode 5 and, thus, perpendicular to the radial electric field intensity produced by the direct voltage. If cathode 5 emits electrons and a large enough magnetic field intensity relative to the electric field intensity exists, the emitted electrons will revolve about cathode 5 within a cylindrical envelope. A high frequency alternating voltage is applied between anodes 1 and 2 by means of transformer 6. The capacitance seen between anodes 1 and 2 by this voltage can be increased above the static capacitance existing when the tube is turned off by the rotating space charge cloud. The diameter of the cloud is a direct function of the applied direct anode-to-cathode voltage and it may be shown that the space charge boundary acts as a metallic surface to high frequency energy impinging upon it for the values of magnetic field intensity employed. Therefore, as the direct anode voltage is raised from zero, the space charge cloud expands in diameter toward the anode and increases the anode-to-anode capacity.

At the same time, however, the cloud acquires an average angular velocity about the cathode which increases proportionately with the cloud diameter. Consequently, there are voltage values for which the cloud is synchronous with the applied high frequency signal and measures must be taken to avoid power extraction or generation by the electron-cloud capacitor. As any electron intercepts the fringing high frequency electric field between the anodes, it either gives up or absorbs energy from the high frequency voltage source, depending upon its direction of motion with respect to the direction of the electric field.

When these electrons rotate about the cathode at an average angular velocity which is a sub-harmonic of the frequency of the source being tuned, synchronization between the source and the rotating electrons takes place and a large dip occurs in the deviation curve of the capacitor, and the output power from the high frequency source is altered. This transfer of energy from a rotating electron to a negative anode as an electron passes the anode is known in the art as magnetron action.

In practice, the direct voltage between the anode and the cathode may be used as the variable parameter to control the capacitance between anodes 1 and 2, while the other parameters, cathode temperature, electric field intensity, and magnetic field intensity are held constant. It is found that a linear curve of capacitance versus voltage does not characterize such a device because, as the frequency of rotation of the electrons approach sub-harmonic frequencies of the controlled oscillator frequency, the large dips or irregularities heretofore mentioned appear in the curve.

To eliminate these harmful effects caused by magnetron action of the device, I have built an electron cloud capacitor in which the circumferential component of the high frequency electric field applied across the gaps between the anodes of the device by the high frequency oscillator being modulated is minimized so as to reduce or entirely eliminate magnetron action.

Referring to Fig. 2, a pair of helically shaped anodes 8 and 9 which are insulated from one another for high frequency voltages form the envelope of a cylindrical space in which a cylindrical cathode 10 has its longitudinal axis coinciding with the longitudinal axis of the cylinder formed by the inner walls of the anodes. A source of magnetic flux produces a magnetic field H parallel to the longitudinal axis of cathode 10. A high frequency voltage supplied to anodes 8 and 9 produces an electric field between the anodes but, because of the helical gap, part of this wave is parallel to the longitudinal axis of the cathode, and only a small part of it is circumferential to the path of the electrons. Decreasing the helical pitch increases the longitudinal component of the high frequency field between the anodes and thus decreases the circumferential electric field. Consequently, as the pitch of the helix is decreased, the circumferential electric field is reduced which, in turn, reduces the magnetron effect hereinbefore described. Fig. 3 shows an electron cloud capacitor of the helical anode type in which the pitch of the helical gap is less than the pitch of the helical gap between the anodes of Fig. 2. In Fig. 2, the helix rotates 180° along the length of the anodes while in Fig. 3, this angle of rotation is 360°. As the angle of rotation increases for a given length of anode, the capacitance between the anodes increases, and, as a result, for a given fixed anode-to-anode capacitance the axial length of the anodes must be reduced.

If, however, the pitch of the helix is decreased to the limiting case, and the width of the anodes is increased, the anode structure of Fig. 4 results. Anodes 11 and 12 are individual cylinders enclosing a cylindrical cathode 13 having its longitudinal axis coinciding with the longitudinal axis of cylinders 11 and 12. This being the limiting case, there is no circumferential high frequency electric field produced between the anodes, and the entire field is parallel to the longitudinal axis of the cathode. Therefore, no magnetron action whatsoever occurs in this capacitor when it is used to tune a high frequency source of electro-magnetic waves.

In Fig. 5 there is shown a typical deviation curve of frequency deviation vs. anode-to-cathode direct voltage of a high frequency oscillator tuned with an electron-cloud capacitor.

In all of these helical type electron cloud capacitors, the anode-to-cathode direct voltage, and thus, the capacitance between the anodes may be varied at the frequency of an intelligence wave by supplying the intelligence voltage wave between the anode and the cathode of the device. When this capacitor is part of the resonant circuit of a high frequency oscillator, the output wave of the oscillator may be frequency modulated with an intelligence voltage wave which is supplied between the anodes and cathode of the variable electron cloud capacitor.

Because of the fast response time of this variable capacitor, because of its non-synchronous nature, and because of its smooth deviation curve throughout a practical capacitive range, it finds application as a means for modulating ultra high frequency waves with other high frequency intelligence waves representing, for example, television video signals.

Referring to Fig. 6, there is shown a practical embodiment of the zero helical pitch anode type electron cloud capacitor of Fig. 4 in which a pair of anodes 14 and 15 are respectively attached to electron conducting members 16 and 17. Cathode 18 is directly heated by a direct voltage source 19 and conducting members 16 and 17 are electrically connected to ground through high frequency choke coils 20 and 21. A negative direct voltage is supplied to cathode 18 through the secondary winding of transformer 22 from a direct voltage source 23. A direct voltage source 24 supplies direct voltage through the primary winding of transformer 22 to the anode of electron discharge device 25. The cathode of device 25 is connected to ground and the control electrode is supplied with a modulating voltage signal from a source of modulating voltage 26. The high frequency oscillator being modulated is connected to ends 27 and 28 of members 16 and 17 such that the electron cloud capacitor comprising anodes 14 and 15 and cathode 16 is part of the resonant circuit of the oscillator. The modulated output wave is taken off at the other ends of these members and a resistor 29 represents this load on the oscillator. A source of magnetic flux 30 supplies a magnetic field Hx parallel to the longitudinal axis of cathode 18 within the area enclosed by anodes 14 and 15.

In operation, the modulating or intelligence signal of source 26 is amplified by device 25 and magnetically coupled from the primary winding to the secondary winding of transformer 22. Because the voltage across the secondary winding of transformer 22 is in series with the voltage of source 23, the anode-to-cathode direct voltage has superimposed upon it the amplified voltage from modulating source 26. As previously explained, the capacitance between anodes 14 and 15 thus varies with the amplitude of the modulating voltage from source 26 and the oscillator output wave is frequency modulated with this signal.

While it is understood that the design specifications for the electron cloud capacitors shown in Figs. 2 and 4 may vary for any particular application, the following dimensions have been found satisfactory:

|  | Fig. 2 | Fig. 4 |
| --- | --- | --- |
| Helical Pitch | 180°/Length of Anode | 0°/Length of Anode. |
| Cylindrical Diameter of Anodes | 0.25″ | 0.203″. |
| Cathode Diameter | 0.125″ | 0.030″. |
| Magnetic Field Intensity | 1,400 gauss | 1,400 gauss. |
| Anode Direct Voltage Range | 0-2000 volts | 0-2000 volts. |
| Typical Percentage Frequency Deviation of a Magnetron Oscillator Produced by Electron Cloud Capacitor. | 1½% at 850 mc | 5½% at 430 mc. |

Modifications of this invention will occur to those skilled in the art and it is desired to be understood, therefore, that this invention is not to be limited to the particular embodiment disclosed, but that the appended claims are meant to cover all the modifications which are within the spirit and scope of this invention.

What I claim as new and desire to secure by Letters Patent of the United States is:

1. A variable electronic capacitance device adapted to be utilized as a capacitance element in an electrical circuit comprising a cylindrically shaped cathode, a pair of cylindrical anodes surrounding said cathode coaxial therewith and spaced therefrom, said anodes being spaced from each other along the axis of said cathode, means establishing a magnetic field in the space between said anodes and said cathode parallel to the axis of said cathode, means establishing a direct current potential difference between said anodes and said cathode whereby an electron cloud of substantially cylindrical shape is created between said cathode and said anodes, and means for varying the potential between said cathode and said anodes to vary the diameter of said electron cloud and the capacitance between said anodes.

2. A variable electronic capacitance device adapted to be utilized as a capacitance element in an electrical circuit comprising a cylindrically shaped cathode, a first anode including a conductive apertured portion concentrically positioned about a portion of said cathode, a second anode spaced from said first anode and concentrically positioned about another portion of said cathode, means establishing a magnetic field parallel to the axis of the cathode in the space between the cathode and said anodes, means establishing a direct current potential difference between said anodes and said cathode whereby an electron cloud is created between said cathode and said anodes, and means for varying the potential between said cathode and said anodes to vary the diameter of said electron cloud and the capacitance between said anodes.

3. An electronic capacitor comprising an elongated electron emissive cathode, a pair of capacitor electrodes each spaced from and surrounding said cathode and coaxial therewith, said electrodes being spaced from each other along the axis of said cathode, means establishing a magnetic field parallel to the axis of the cathode in the space between the cathode and said capacitor electrodes, and means for establishing a direct current potential between said pair of electrodes and said cathode whereby an intermediate electrode comprising an electron cloud is created in said space between said cathode and said electrodes having a diameter proportional to said direct current potential.

PHILIP H. PETERS, JR.

REFERENCES CITED

The following references are of record in the file of this patent:

UNITED STATES PATENTS

| Number | Name | Date |
| --- | --- | --- |
| 1,716,161 | Allcutt | June 4, 1929 |
| 2,173,252 | Fritz | Sept. 19, 1939 |
| 2,243,829 | Brett | June 3, 1941 |
| 2,463,632 | Labin | Mar. 8, 1949 |